United States Patent
Rios, III

(10) Patent No.: US 10,592,746 B2
(45) Date of Patent: *Mar. 17, 2020

(54) ON DEMAND VISUAL RECALL OF OBJECTS/PLACES

(71) Applicant: AT&T Intellectual Property I, L.P., Atlanta, GA (US)

(72) Inventor: Roque Rios, III, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,263

(22) Filed: Jul. 16, 2018

(65) Prior Publication Data

US 2018/0322345 A1 Nov. 8, 2018

Related U.S. Application Data

(63) Continuation of application No. 15/436,940, filed on Feb. 20, 2017, now Pat. No. 10,055,644.

(51) Int. Cl.
| | |
|---|---|
| *H04N 9/80* | (2006.01) |
| *G06K 9/00* | (2006.01) |
| *H04N 5/77* | (2006.01) |
| *G11B 27/30* | (2006.01) |
| *G11B 27/34* | (2006.01) |
| *G06Q 30/02* | (2012.01) |
| *G06F 16/78* | (2019.01) |

(52) U.S. Cl.
CPC ..... *G06K 9/00671* (2013.01); *G06F 16/7867* (2019.01); *G06K 9/00691* (2013.01); *G06Q 30/0261* (2013.01); *G11B 27/3081* (2013.01); *G11B 27/34* (2013.01); *H04N 5/77* (2013.01); *H04N 5/772* (2013.01)

(58) Field of Classification Search
CPC ............ G06K 9/00671; G06F 17/3082; G06Q 30/0261; G11B 27/3081; G11B 27/34; H04N 5/772
USPC .......................... 386/241, 230, 239, 224, 248
See application file for complete search history.

(56) References Cited

U.S. PATENT DOCUMENTS

| | | | |
|---|---|---|---|
| 5,974,201 A | 10/1999 | Chang et al. |
| 7,986,230 B2 | 7/2011 | Gabara et al. |
| 8,964,054 B2 | 2/2015 | Jung et al. |
| 9,041,826 B2 | 5/2015 | Jung et al. |
| 9,188,447 B2 | 11/2015 | Rakshit |

(Continued)

OTHER PUBLICATIONS

Funk, Markus, "Representing Indoor Location of Objects on Wearable Computers with Head-Mounted Displays", ACM, Mar. 2014.

*Primary Examiner* — Robert Chevalier
(74) *Attorney, Agent, or Firm* — Guntin & Gust, PLC; Andrew Raymond

(57) ABSTRACT

Aspects of the subject disclosure may include, for example, observing a plurality of objects viewed through a smart lens, wherein the plurality of objects are in a frame of an image viewed by the smart lens, determining an identification for an object of the plurality of objects, assigning tag information for the object based on the identification, storing the tag information for the object and the frame in which the object was observed, receiving a recall request for the object, retrieving the tag information for the object and the frame responsive to the receiving the recall request, and displaying the tag information and the frame. Other embodiments are disclosed.

20 Claims, 7 Drawing Sheets

(56) References Cited

U.S. PATENT DOCUMENTS

| | | | |
|---|---|---|---|
| 9,412,001 | B2 | 8/2016 | Lee et al. |
| 9,418,080 | B1 | 8/2016 | Linnel et al. |
| 10,055,644 | B1 * | 8/2018 | Rios, III ............ G06K 9/00671 |
| 2015/0186426 | A1 | 7/2015 | Jeong et al. |
| 2015/0198455 | A1 | 7/2015 | Chen et al. |
| 2015/0206412 | A1 | 7/2015 | Lachance |
| 2018/0239962 | A1 | 8/2018 | Rios, III |

* cited by examiner

300

800

ON DEMAND VISUAL RECALL OF OBJECTS/PLACES

CROSS-REFERENCE TO RELATED APPLICATION(S)

This application is a continuation of U.S. patent application Ser. No. 15/436,940, filed on Feb. 20, 2017. The contents of each of the foregoing is hereby incorporated by reference into this application as if set forth herein in full.

FIELD OF THE DISCLOSURE

The subject disclosure relates to a system and method for organizing content viewed through smart lenses.

BACKGROUND

Various conventional forms of smart lens technology can record content while the wearer observes objects and places around him.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for recording and providing a recall function for wearable camera devices. Other embodiments are described in the subject disclosure.

One or more aspects of the subject disclosure include a method for observing a plurality of objects viewed through a smart lens, wherein the plurality of objects are in a frame of an image viewed by the smart lens, determining an identification for an object of the plurality of objects, assigning tag information for the object based on the identification, storing the tag information for the object and the frame in which the object was observed, receiving a recall request for the object, retrieving the tag information for the object and the frame responsive to the receiving the recall request, and displaying the tag information and the frame.

One or more aspects of the subject disclosure include a device that includes a processing system including a processor and a memory that stores executable instructions that, when executed by the processing system, facilitate performance of operations that include receiving a plurality of frames viewed by a smart lens device, wherein the frames include a plurality of objects, assigning an object tag of plurality of object tags for an object of the plurality of objects, assigning, as a tagged frame, the object tag to a frame of the plurality of frames when the object is in the frame, receiving a recall request from the smart lens device, wherein the recall request includes an identity of an object to be recalled, determining, as a requested tag, which object tag of the plurality of object tags corresponds to the recall request, retrieving the requested tag and a requested tagged frame responsive to the receiving the recall request, and providing the requested tag and the requested tagged frame to the smart lens device, wherein the smart lens device displays the requested tag and the requested tagged frame.

One or more aspects of the subject disclosure include a machine-readable storage medium, including executable instructions that, when executed by a processing system including a processor, facilitate performance of operations that include observing a plurality of objects viewed through a smart lens, wherein the plurality of objects are in a frame of an image viewed by the smart lens, determining an identification for an object of the plurality of objects, assigning tag information for the object based on the identification, storing the tag information for the object and the frame in which the object was observed, receiving a recall request for the object, retrieving the tag information for the object and the frame responsive to the receiving the recall request, and displaying the tag information and the frame.

Figure 1:
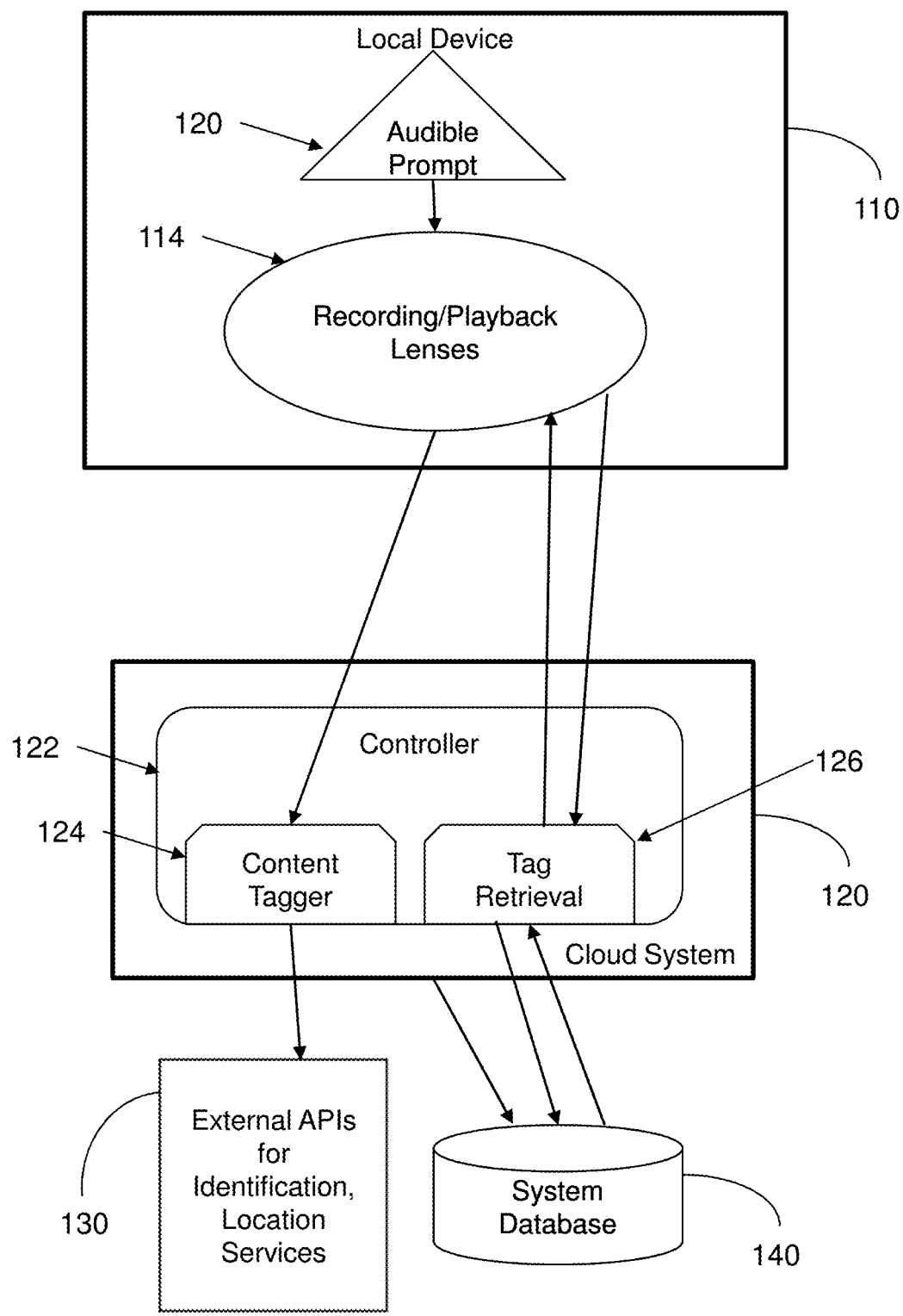
FIG. 1 depicts an illustrative embodiment of system 100.

FIG. 1 illustrates an exemplary embodiment of system 100. Referring to FIG. 1, system 100 can include a local device 110. Local device 110 can include a wearable smart lens 114, such as a wearable smart contact lens or a wearable camera device. Exemplarily, local device 110 can include a processor or processing system that can communicate images or frames from the camera device via a transceiver to the Internet or other computing systems, such as a server or a local computer. Exemplarily, the wearable smart lens 114 can include a display device to display images to the user while being worn. In other embodiments, images captured by the wearable smart lens 114 can be displayed at other display devices associated with the wearable smart lens 114, computer, or server. Exemplarily, a graphical user interface can be provided so the wearer can operate the various function of the wearable smart lens 114. In some embodiments, the wearable smart lens 114 can include an intermediary device to perform some or all of the necessary processing functions to operate and to communicate with other devices.

In some embodiments, the wearable smart lens 114 can include the ability to record images seen by the wearer. In additional embodiments, the wearable smart lens 114 can provide a display device to provide images to the wearer while the wearable smart lens 114 is being worn. Exemplarily, an audio prompt 120 can be received or provided. The audio prompt 120 can be received via a microphone or provided via a speaker.

In some embodiments, the audio prompt 120 can indicate to the wearer that an object is visible. In other embodiments, the audio prompt 120 can be an instruction to tag or otherwise identify and object that is visible to the wearable smart lens 114. For example, the display device can provide a visual prompt for the wearer to identify an observed object. The wear can then provide an audio prompt 120 which includes instructions containing the proper tag and itemization of the object.

Exemplarily, information gathered from the local device 110 can be provided to a central system, such as the cloud system 120. In some embodiments, the central system can simply be a local computing system or a server connected to other computing devices. The cloud system 120 can include a controller 122. The controller 122 can include a content tagger portion 124 and a tag retrieval portion 126. Exemplarily, the content tagger portion 124 can record and store identifying data of objects observed by the wearable smart lens 114. Exemplarily, the tag retrieval portion 126 can receive requests from the local device 110 or the wearable smart lens 114 to retrieve the identifying data via a database 140 associated with the controller 122. In addition, the content tagger 124 can communicate with external devices through an API 130 for additional services.

Figure 2:
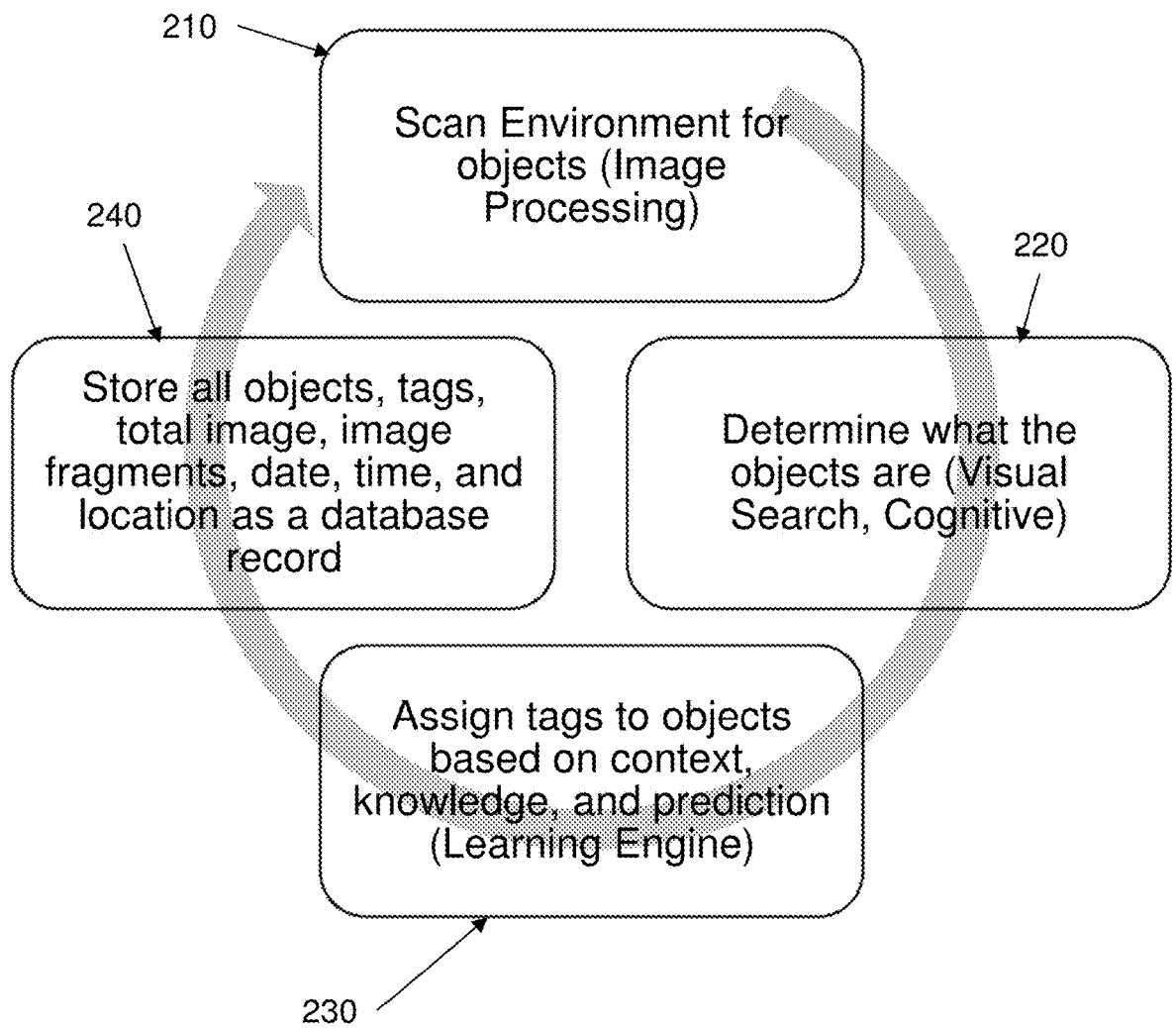
FIG. 2 depicts an illustrative embodiment of a method used in portions of the system described in FIG. 100.

FIG. 2 illustrates an exemplary method 200 that system 100 of FIG. 1 can perform. Exemplarily, in Step 210, the wearable smart lens 114 of FIG. 1 can scan an environment for objects. The scan includes the environment, including the images of the environment itself as well as images of objects captured within the environment. Exemplarily, the wearable smart lens 114 follows the head movement and/or eye movements of the wearer to record what the wearer sees.

Next in Step 220, the system 100 can determine the identity of what the objects are. That is, objects can be sorted according to type and usage. For example, the objects can be identified personal items such as books or keys. In other examples, the objects can be identified as a class of objects, such as books versus magazines. For example, the Cloud can provide connection management for database storage, an object index for universe (like a universal product catalog, Amazon™ for instance), a tag map for all users in household, and image processing, among other services.

Figure 8:
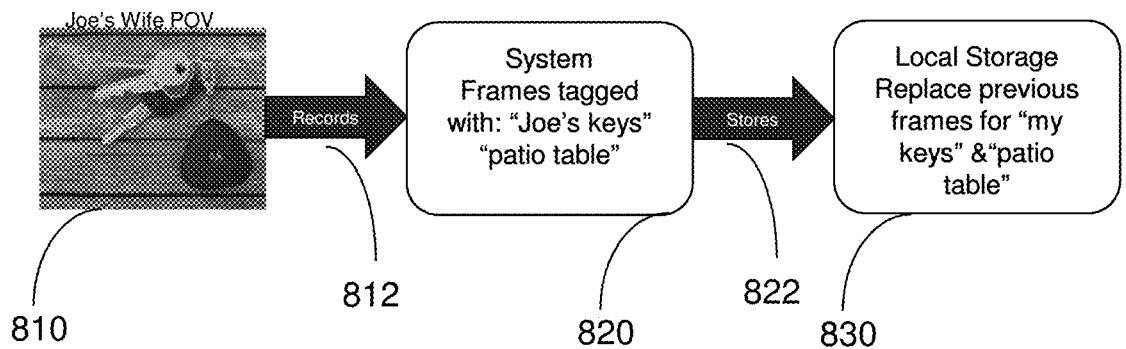
FIG. 8 depicts an illustrative embodiment of a method used in portions of the system described in FIG. 100.
Figure 8:
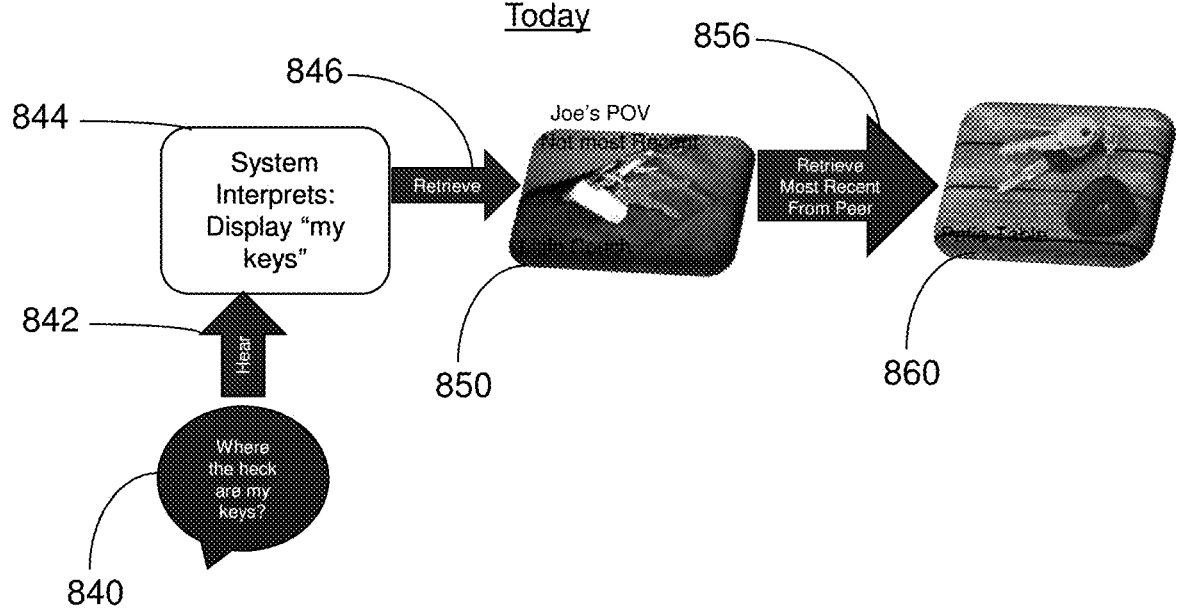

In Step 230, tags can be assigned based on user input or according to a learning engine process in which the context and knowledge of the user can be used to predict what tag to apply to the object. For example, a Tag Map can be built automatically through inferred and triggered insights between the user and the object. For example, in one inferred insight: Person X uses Object "A" exclusively. Object is tagged as Person X's Object A (as illustrated in FIG. 8: "my keys"). In another example, a triggered insight can include: Person X calls Object B by a nickname frequently. Object B is tagged with this nickname, such as "favorite shirt". Exemplarily, the tagging process can use Natural Language Processing (NLP).

Examples of tags can include:
Date or time information;
Location information;
Object information;
Object Tags "[ ]" information (such as [book], [coffee cup], or [keys]);
Observed By (user/device that made this observation) information;
Image Fragment (i.e., a section of raw image that has object in it) information; and/or
Links to Full Captured image (ref to separate table of just unsegmented images).
Next, in Step 240, the identities of these objects and their tags can be stored in the database 140 for retrieval at a future point in time.

Figure 3:
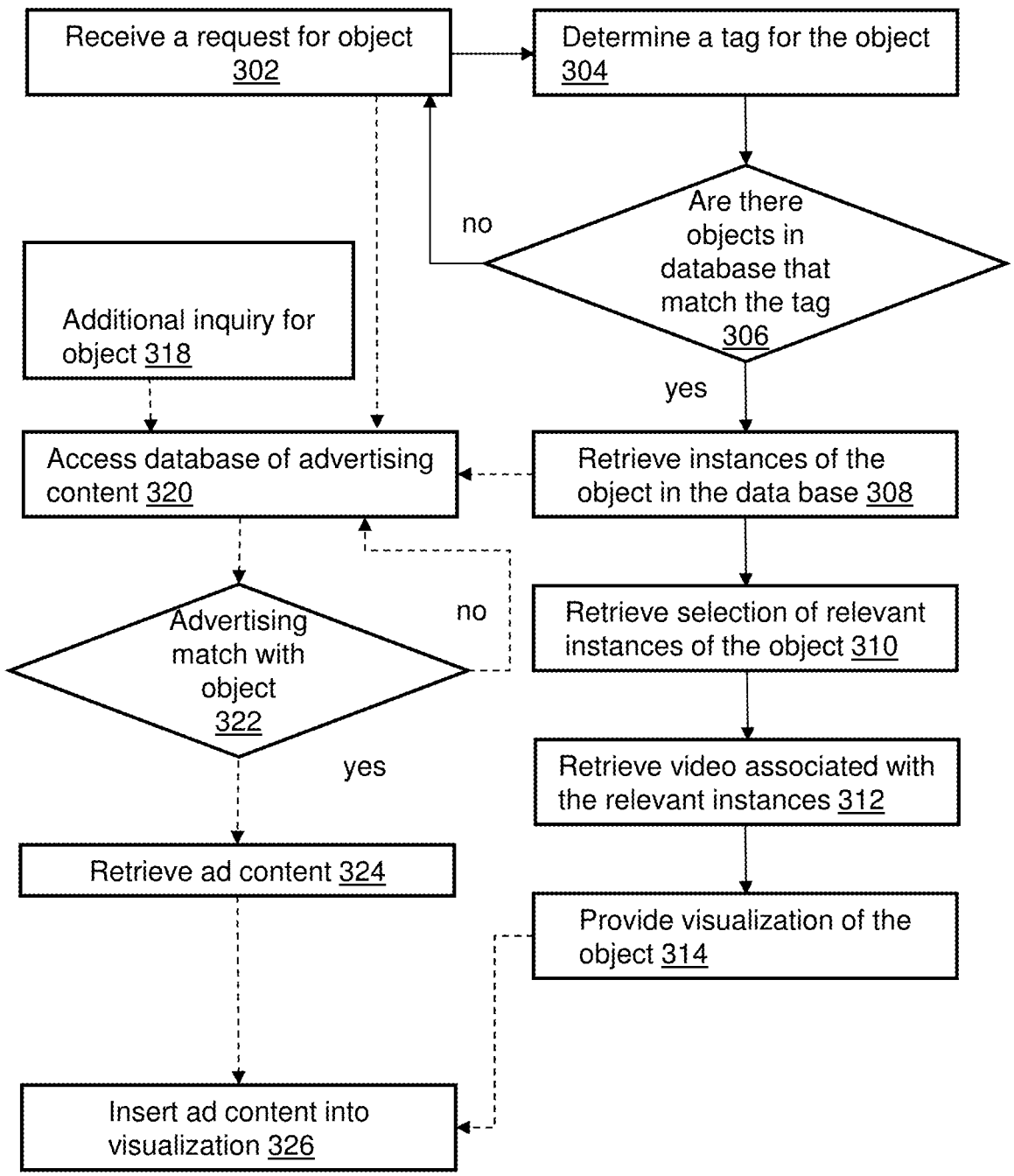
FIG. 3 depicts an illustrative embodiment of a method used in portions of the system described in FIG. 100.

FIG. 3 illustrates a method 300 that can be exemplarily used in conjunction with system 100. The local device 110 can receive a request for a recall of an object in Step 302. The request can be a verbal request received via a microphone associated with the local device 110. Step 302 can include an activation that is reactive in which the user asks for the location of an object. Step 302 can include an activation that is passive wherein the user is observed searching locations that an object or objects is frequently found in. For example, the user can be searching on top of dresser on which the user frequently places his keys. Step 302 can include an activation that is proactive in nature in which the user is known to be performing an activity that requires an object that the user does not currently possess. For example, the user may be approaching a store without his wallet or a car without his keys.

In Step 304 a tag is determined for the subject of the request for recall. Thus, if a user requests a last known location for lost keys, the appropriate tags for user keys can be determined in Step 306. Accordingly, the database can be searched for the appropriate tags. This process can include a gathering step in which all information on wanted objects could be collected, including from across multiple users in a household or office environment. Interactions between relevant objects and other tagged objects can be ascertained. For example, a frequent storage location or a correlation between activities and objects can be determined. Thus, a desk on which keys are stored can be identified as a key storage location. In another example, it is known that a user requires his wallet to go to a store or to drive a car.

In some embodiments, a user-agnostic time-line of wanted objects can be created. The time-line of wanted objects can include a timeline of a shifting locations for objects that have been observed. In some instances, text can be displayed on or near the observed objects to identify objects related to the search, such as indicating a location at which a wanted object is frequently found. Additionally, a streaming playback of the object's life story can be created based on observations of the object by the user and other users. The life story illustrates what has happened to the object.

In Step 308, the database can be searched for record of those tags. A selection of relevant locations in the database can be retrieved in step 310. These relevant selections can be presented to the user so that the wearer can choose which instance to view. In other embodiments, the system can select from the relevant instances to present a most applicable or appropriate instance. In Step 312, the selected video clip can be retrieved. In Step 314, the visualization can be provided to the wearer.

In additional embodiments, the alternative steps illustrated with dashed lines can occur. For example, once the objects are retrieved in Step 308, Step 320 can access a database composed of advertising content related to the category for which the object is relevant. In additional embodiments, Step 320 can be accessed once a request for the object has been received in Step 302 or after receiving an additional inquiry about the object in Step 318. For example, if the wearer questions the location of a missing item, the wearer could further articulate a request to simply buy a replacement for that item. In other instances, advertising related to the object could be retrieved.

In other embodiments, objects not currently being considered by the wearer could nonetheless activate the process. In some embodiments, the observation by the device of an item could activate the process independently. Thus, if the wearer observes a particular product, an advertising session could be activated for that product. In some instances, the wearer may observe an advertisement for a product and an inquiry about that ad could initiate the retrieval of advertising materials for that product from the database.

Next, in Step 322, it is determined if there is advertising for the object in question. Thus, the database could be accessed for advertising based on the object's categorizations or other relevant data. Then, in Step 324, the content could be retrieved and displayed on the display in Step 326. For example, the ad could be displayed in the visualization of Step 314 or independently of the visualization.

Exemplarily embodiments can include the ability to review a scene currently being viewed against other scenes in the past to determine a change in the observed environment. Thus, in one embodiment, a verbal command can ask "what has changed" and two or more scenes can be compared to determine if an item has been added or deleted from a scene. In other embodiments, the type of search can be further clarified to exclude some object types or to otherwise focus on only some object types. In addition, the time frame for which scenes can be compared can be clarified. For example, a user could request a change in number of books on a desk between scenes captured one week ago and a currently captured scene.

Exemplarily, smart lens technology can include wearable glasses and wearable contact lenses that unobtrusively can record, via a video recording, the very objects and scenery that the wearer of the smart lenses are viewing as the wearer observes them. In additional embodiments, body mounted cameras and other video recording devices can also be accessed.

Exemplarily, as video content of the environment which the wearer is observing is recorded, embodiments of the present invention can catalog objects as they are viewed. These objects can be cataloged according to a location at which the object is observed. Exemplarily, the location can be mapped to the wearer's routines, the wearer's friends and routines of interconnected friends and relatives, and the movement of the wearer through the day. The objects can be cataloged according to a time marker related to when the object was is observed. Additionally, the object can be categorized according to the object type. For example, the object can be listed as personal objects, such as keys or phones, as well as type of object as a class such as listing all books that the wearer observes.

FIG. 8 illustrates an exemplary embodiment of the present invention that would operate in system 100 while employing methods 200 and 300. As shown in Step 810, one user's point of view (here: "Joe's Wife") observes a scene such as the location of keys and a patio table. Exemplarily, this scene is recorded in Step 812. Exemplarily, the correlation between the keys and the patio table are noted and tagged within the frame of the scene in Step 820. Next, in Step 822, these system tags would be stored. Exemplarily, a database that stores tags for "my keys" and "patio table" would be updated with the current frame in Step 830. The tags could also include time information, such as the date (illustrated in this example as "yesterday").

At another point in time (illustrated in this example as "today"), another use ("Joe") would inquire about the location of "my keys" as exemplarily illustrated in Step 840. The user's words could be meant as a command or simply an observation. At Step 842, the wearable lens device could hear this command or observation. At Step 844, the system could exemplarily interpret the user's words or commands as a request to display "my keys". Exemplarily, tags related to "keys" or "my keys" could be searched and an appropriate frame could be retrieved in Step 846. In Step 850, the user's frame would return his most recent observation of "my keys". In this example, the frame could be overlaid with a notation that this frame is not the most recent location of "my keys" and in Step 856 a more recent frame could be retrieved. Thus, the other user's more recent frame can be presented in Step 860.

While for purposes of simplicity of explanation, the respective processes are shown and described as a series of blocks in FIGS. 2, 3, and 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
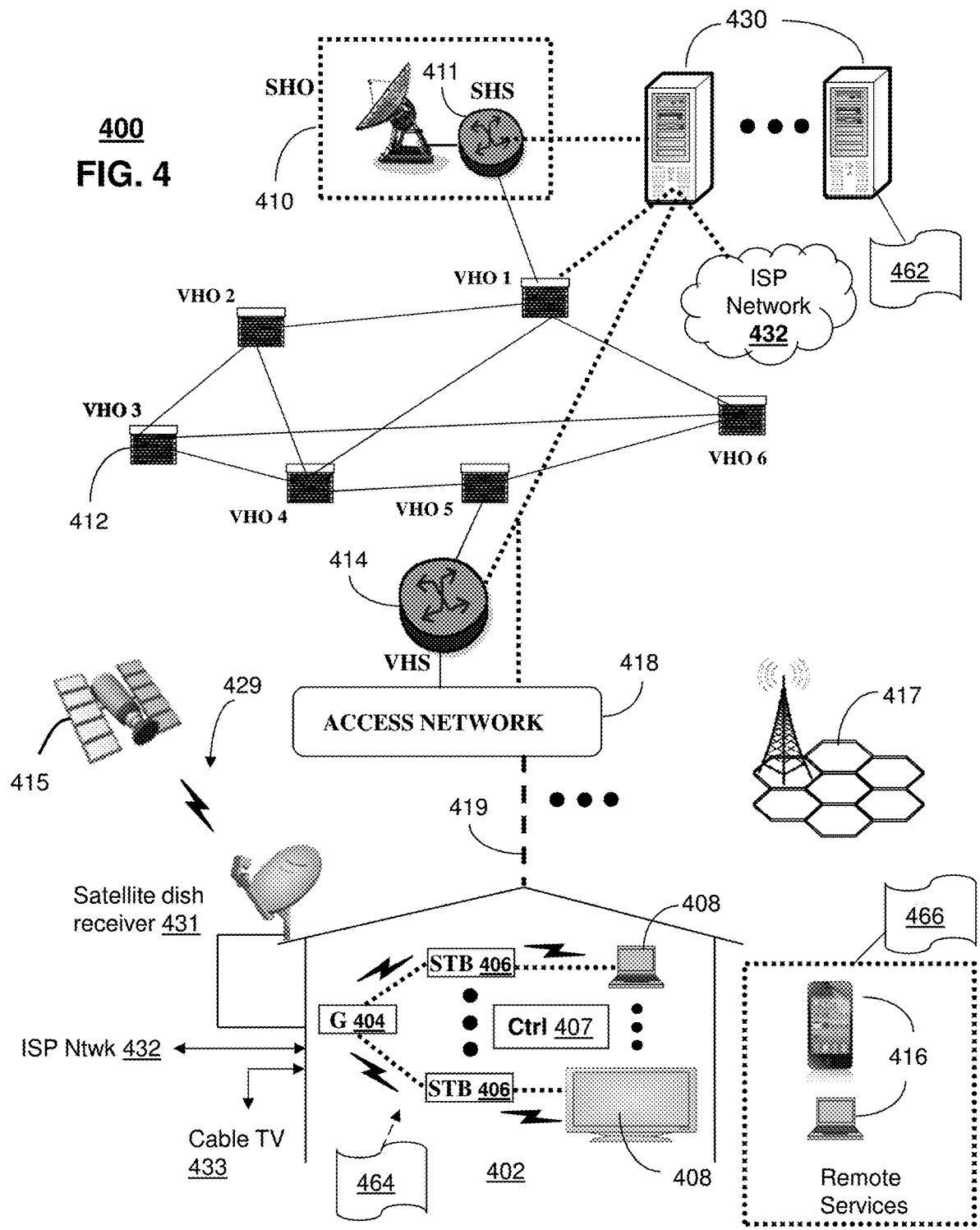
FIG. 4 depicts illustrative embodiments of a communication system that provide media services according to system 100 and methods 200 and 300 of FIGS. 2-3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with system 100 of FIG. 1 as another representative embodiment of communication system 400. For instance, one or more devices illustrated in the communication system 400 of FIG. 4 can perform a method including observing a plurality of objects viewed through a smart lens, determining an identification for an object of the plurality of objects, assigning a tag for the object based on the identification, obtaining a trigger related to the object, obtaining location information for the object, storing the trigger, the tag, and the location information for the object, receiving a recall request based on the trigger related to the object, retrieving the tag and the location information for the object responsive to the receiving the recall request, and providing the tag and the location information to a user that provided the recall request.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a visual recall system (herein referred to as visual recall system 430). The visual recall system 430 can use computing and communication technology to perform function 462, which can include among other things, the recollection of past viewed images of method 300 of FIG. 3. For instance, function 462 of visual recall system 430 can be similar to the functions described for the recollection of past viewed images of method 300 of FIG. 3. The media processors 406 and wireless communication devices 416 can be provisioned with software functions 464 and 466, respectively, to utilize the services of visual recall system 430. For instance, functions 464 and 466 of media processors 406 and wireless communication devices 416 can be similar to the functions described for the collection of past images of method 200 of FIG. 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
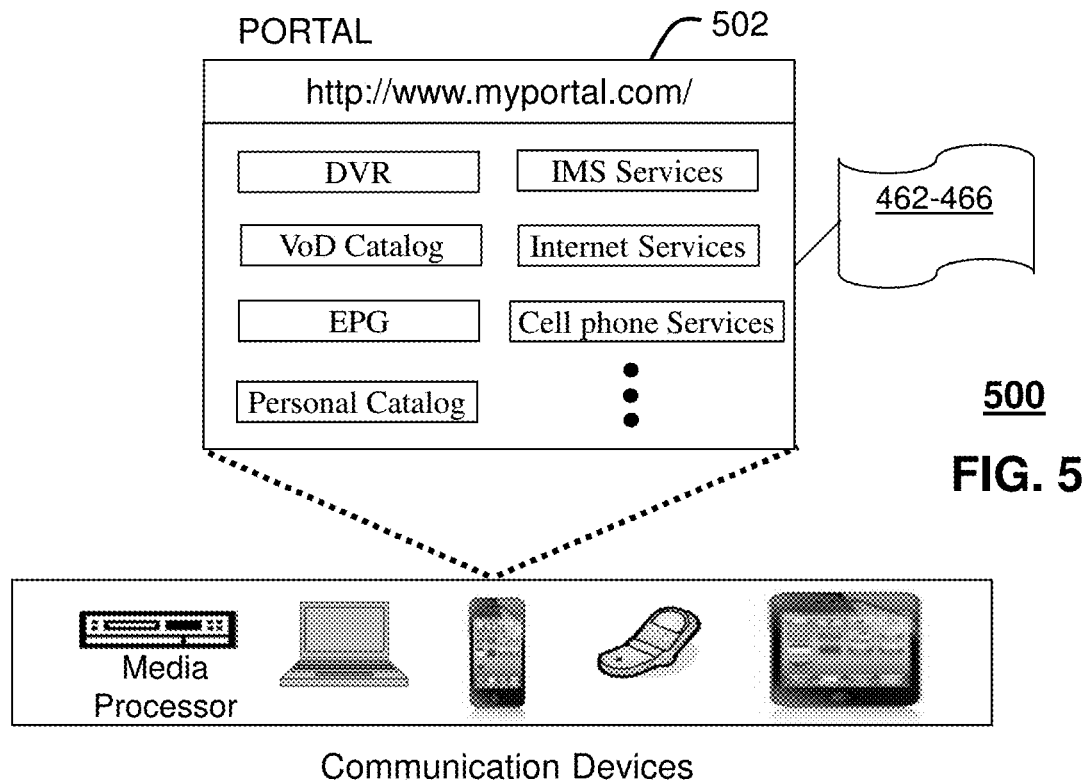
FIG. 5 depicts an illustrative embodiment of a web portal for interacting with the communication systems of system 100 and methods 200 and 300 of FIGS. 2-3.

FIG. 5 depicts an illustrative embodiment of a web portal 502 of a communication system 500. Communication system 500 can be overlaid or operably coupled with system 100 of FIG. 1 and communication system 400 as another representative embodiment of system 100 of FIG. 1 and communication system 400. The web portal 502 can be used for managing services of controller 122 and local device 110 of FIG. 1 and communication systems 400. A web page of the web portal 502 can be accessed by a Uniform Resource Locator (URL) with an Internet browser using an Internet-capable communication device such as those described in local device 110 of FIG. 1 and communication device 400 of FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462, 464, and 466 to adapt these applications as may be desired by subscribers and/or service providers of system 100 of FIG. 1 and communication system 400. For instance, users of the services provided by cloud system 120 or visual recall system 430 can log into their on-line accounts and provision the servers or visual recall system through their mobile communication devices, tables, or through an interaction with the local device 110, and so on. Service providers can log onto an administrator account to provision, monitor and/or maintain the system 100 of FIG. 1 or visual recall system 430.

Figure 6:
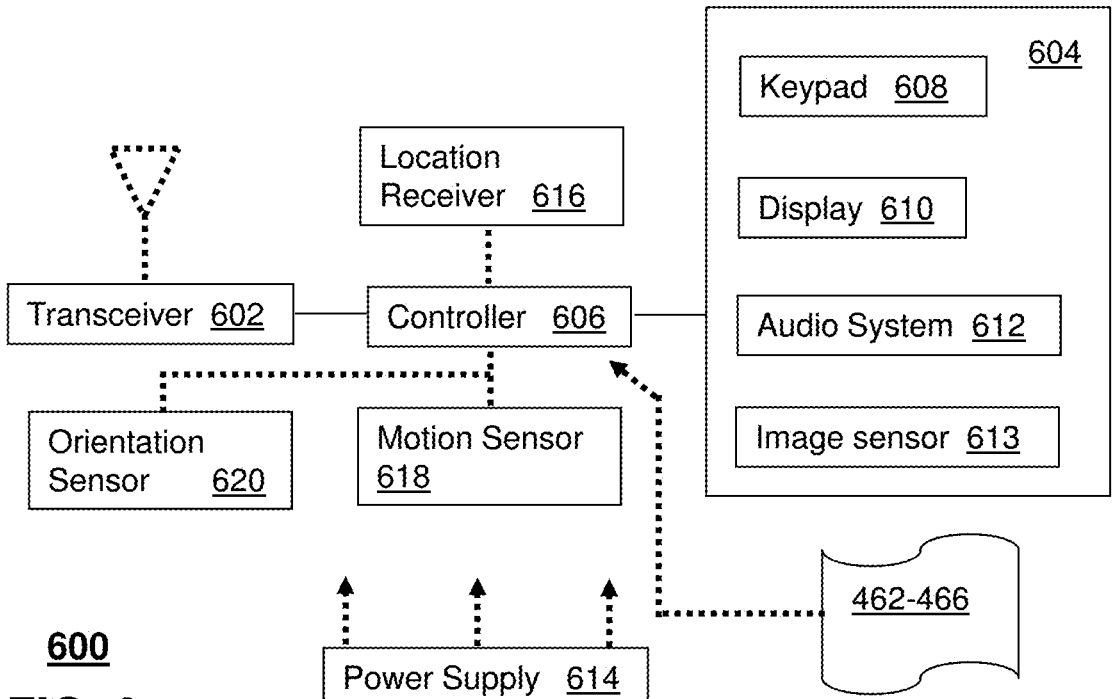
FIG. 6 depicts an illustrative embodiment of a communication device.

FIG. 6 depicts an illustrative embodiment of a communication device 600. Communication device 600 can serve in whole or in part as an illustrative embodiment of the devices depicted in system 100 of FIG. 1 and communication system 400 and can be configured to perform portions of methods 200 and 300 of FIGS. 2 and 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of [system 100 of FIG. 1, the media processor 406, the media devices 408, or the portable communication devices 416 of FIG. 4. It will be appreciated that the communication device 600 can also represent other devices that can operate in system 100 of FIG. 1 and communication system 400 of FIG. 4 such as a gaming console and a media player. In addition, the controller 606 can be adapted in various embodiments to perform the functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, in some embodiments, the wearable lenses can be recorded and monitored for persons other than the wearer. For example, a parent can monitor the activities and objects viewed by friends, family members, and children. In other embodiments, pets can be provided with their own wearable lenses so that the objects and places they explore can be categorized as well. That is, in some embodiments, the user can observe objects that other wearers observe to learn the placement of objects that are encountered. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
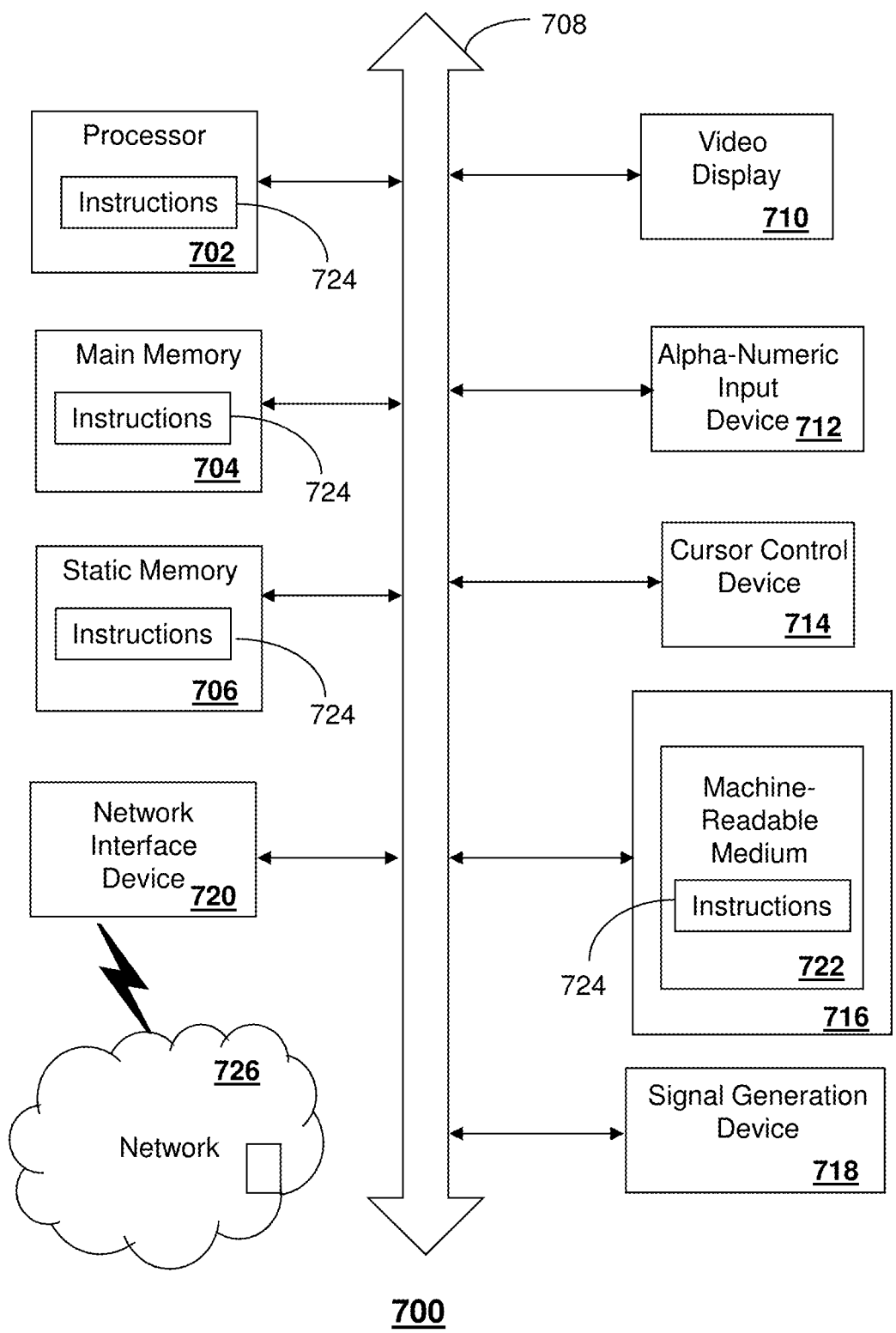
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the visual recall system 430, the media processor 406, as well as the local device 110 (i.e., the wearable lens device) of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining, by a processing system comprising a processor, an identification for an observed object of a plurality of objects observed through a smart lens, wherein the plurality of objects are in a frame of an image viewed by the smart lens, wherein tag information for the observed object is assigned and stored based on the frame in which the observed object was observed by the smart lens;
    receiving, by the processing system, a recall request for the observed object;
    retrieving, by the processing system, the tag information for the observed object and the frame responsive to the receiving the recall request; and
    displaying, by the processing system, the tag information and the frame for the observed object responsive to the retrieving the tag information for the observed object.

2. The method of claim 1, further comprising:
    obtaining time information for the frame; and
    obtaining location information for the object in the frame.

3. The method of claim 2, wherein the retrieving the tag information further comprises retrieving the time information and the location information.

4. The method of claim 1, further comprising obtaining second tag information and second location information for the object from a related smart lens device.

5. The method of claim 4, further comprising searching the second tag information and second location information responsive to receiving the recall request.

6. The method of claim 5, further comprising comparing the tag information and the location information with the second tag information and the second location information to determine which objects share both the tag information and the second tag information.

7. The method of claim 1, wherein the frame comprises a buffer of video frames of the images recorded by the smart lens.

8. A device, comprising:
a processing system including a processor; and
a memory that stores executable instructions that, when executed by the processing system, facilitate performance of operations, comprising:
receiving a plurality of frames viewed by a smart lens device, wherein the plurality of frames include a plurality of objects, wherein an object tag of plurality of object tags is assigned an object of the plurality of objects;
assigning, as a tagged frame, the object tag to a frame of the plurality of frames when the object is in the frame;
receiving a recall request from the smart lens device, wherein the recall request includes an identity of an object to be recalled;
retrieving a requested tag and a requested tagged frame associated with the identity of the object responsive to the receiving the recall request; and
providing the requested tag and the requested tagged frame to the smart lens device, wherein the smart lens device displays the requested tag and the requested tagged frame.

9. The device of claim 8, wherein the operations further comprise:
receiving time information for the tagged frame; and
receiving location information for the tagged frame.

10. The device of claim 8, wherein the operations further comprise determining if advertising materials are available for the tagged object.

11. The device of claim 10, wherein the operations further comprise providing advertising content to the smart lens device responsive to receiving the recall request, wherein the smart lens device displays the frame with the advertising content.

12. The device of claim 8, wherein the operations further comprise:
receiving a second plurality of frames viewed by a second smart lens device, wherein the second plurality of frames include a second plurality of objects;
determining whether the tagged object appears in a second frame of the second plurality of frames; and
assigning, as the tagged frame, the tag to the second frame of the second plurality of frames when the tagged object is in the second frame.

13. The device of claim 8, wherein the operations further comprise generating relationships between the plurality of objects in the plurality of frames.

14. The device of claim 13, wherein the relationships include determining locations where an object of the plurality of objects are stored.

15. A non-transitory, machine-readable storage medium, comprising executable instructions that, when executed by a processing system including a processor, facilitate performance of operations, comprising:
assigning tag information for an object being viewed through a frame of a smart lens based on an identification for the object;
receiving a recall request for the object;
retrieving the tag information for the object and the frame responsive to the receiving the recall request; and
providing the tag information and the frame to a display device associated with the smart lens.

16. The non-transitory, machine-readable storage medium of claim 15, wherein the operations further comprise:
obtaining time information for the frame; and
obtaining location information for the object in the frame, wherein the providing the tag information and the frame to the display further comprises providing the time information and the location information.

17. The non-transitory, machine-readable storage medium of claim 16, wherein the operations further comprise storing the tag information for the object and the frame in which the object was observed, and wherein the retrieving the tag information further comprises retrieving the time information and the location information.

18. The non-transitory, machine-readable storage medium of claim 16, wherein the operations further comprise obtaining second tag information and second location information from a related smart lens device.

19. The non-transitory, machine-readable storage medium of claim 18, wherein the operations further comprise searching the second tag information and second location information responsive to receiving the recall request.

20. The non-transitory, machine-readable storage medium of claim 19, wherein the operations further comprise comparing the tag information and the location information with the second tag information and the second location information to determine which objects share both the tag information and the second tag information.

* * * * *